United States Patent
Sobolevskiy et al.

(10) Patent No.: US 7,744,840 B2
(45) Date of Patent: Jun. 29, 2010

(54) SELECTIVE CATALYTIC REDUCTION SYSTEM AND PROCESS USING A PRE-SULFATED ZIRCONIA BINDER

(75) Inventors: Anatoly Sobolevskiy, Orlando, FL (US); Joseph A. Rossin, Columbus, OH (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/472,633

(22) Filed: May 27, 2009

(65) Prior Publication Data

US 2009/0285735 A1 Nov. 19, 2009

Related U.S. Application Data

(63) Continuation-in-part of application No. 12/122,116, filed on May 16, 2008.

(51) Int. Cl.
| | |
|---|---|
| *B01D 53/56* | (2006.01) |
| *B01D 53/74* | (2006.01) |
| *G05D 21/00* | (2006.01) |

(52) U.S. Cl. ............... 423/239.1; 422/105; 422/129; 422/168; 422/177; 422/187

(58) Field of Classification Search ............ 423/239.1; 422/105, 129, 168, 177, 187

See application file for complete search history.

(56) References Cited

U.S. PATENT DOCUMENTS

| | | | |
|---|---|---|---|
| 4,312,638 | A | 1/1982 | Koump |
| 5,543,124 | A | 8/1996 | Yokota et al. |
| 5,589,142 | A | 12/1996 | Gribbon |
| 5,710,085 | A | 1/1998 | Absil et al. |
| 5,753,192 | A * | 5/1998 | Dobson et al. ............ 422/177 |
| 5,891,409 | A | 4/1999 | Hsiao et al. |
| 5,955,039 | A | 9/1999 | Dowdy |
| 6,689,709 | B1 | 2/2004 | Tran et al. |
| 7,049,261 | B2 | 5/2006 | Nam et al. |
| 7,105,137 | B2 | 9/2006 | Efstathiou et al. |
| 2007/0110643 | A1 | 5/2007 | Sobolevskiy et al. |
| 2007/0181854 | A1 | 8/2007 | Briesch et al. |
| 2007/0289214 | A1 | 12/2007 | Briesch et al. |
| 2008/0299016 | A1 | 12/2008 | Sobolevskiy et al. |

FOREIGN PATENT DOCUMENTS

JP        4-341325 A    * 11/1992

(Continued)

OTHER PUBLICATIONS

Ola Maurstad; "An Overview of Coal Based Integrated Gasification Combined Cycle (IGCC) Technology", MIT Laboratory for Energy and the Environment, publication No. LFEE 2005-002 WP; (http://free.mit.edu/publications); 2005.

(Continued)

*Primary Examiner*—Timothy C Vanoy

(57) ABSTRACT

A selective catalytic reduction (SCR) process with a palladium catalyst for reducing NOx in a gas, using hydrogen as a reducing agent is provided. The process comprises contacting the gas stream with a catalyst system, the catalyst system comprising $(ZrO_2)SO_4$, palladium, and a pre-sulfated zirconia binder. The inclusion of a pre-sulfated zirconia binder substantially increases the durability of a Pd-based SCR catalyst system. A system for implementing the disclosed process is further provided.

18 Claims, 3 Drawing Sheets

FOREIGN PATENT DOCUMENTS

| | | | | |
|---|---|---|---|---|
| JP | 2000-342972 | A | * | 12/2000 |
| JP | 2001-162171 | A | * | 6/2001 |
| JP | 2006-289175 | A | * | 10/2006 |

OTHER PUBLICATIONS

A. Fritz and V. Pitchon; Applied Catalysis B, Environmental 13 (1997), 1.

R. Burch, M.D.Coleman; Applied Catalysis B: Environmental 23 (1999), 115.

C. Costa et all, Journal of Catalysis, 209 (2002), 456.

C. Costa, A.M. Efstathiou; Applied Catalysis B: Environmental, 72 (2007), 240.

M. Machida, S. Ikeda, D. Kurogi, and T. Kijjima; Applied Catalysis B: Environmental 35 (2001) 107.

* cited by examiner

US 7,744,840 B2

SELECTIVE CATALYTIC REDUCTION SYSTEM AND PROCESS USING A PRE-SULFATED ZIRCONIA BINDER

CROSS REFERENCE TO RELATED APPLICATIONS

This application is a continuation-in-part of U.S. patent application Ser. No. 12/122,116, filed May 16, 2008, the entirety of which is hereby incorporated by reference.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to a catalytic process for the reduction of nitrogen oxides ($NO_x$) in combustion exhaust by selective catalytic reduction (SCR) using hydrogen ($H_2$) as the reducing agent. The present invention also relates to the field of power generation, and more particularly to the control of $NO_x$ emissions produced during combustion of a fuel containing hydrogen to generate power, and specifically to the catalytic treatment of exhaust gases from a gas turbine at a coal gasification plant. However, the invention may also be employed in $NO_x$ abatement from other sources, such as emissions generated during manufacture of nitric acid, within internal combustion engines and the like.

BACKGROUND OF THE INVENTION

Coal-based integrated gasification combined cycle plant (IGCC) technology enables production of electricity with a gas turbine utilizing a fuel that is rich in hydrogen and has a very limited amount of $CO_2$. Combustion of the hydrogen-containing fuel requires an oxidizing source such as air, which contains nitrogen ($N_2$). As a result, a by-product in exhaust gas stemming from hydrogen-containing fuel combustion is a significant amount of $NO_x$. The exhaust gas further comprises significant amounts of $H_2O$, $O_2$, and $SO_2$. The $NO_x$ in the exhaust gas may be reduced by using selective catalytic reduction (SCR) systems along with low $NO_x$ combustors in the gas turbine. Since fuel produced and used at an IGCC plant contains hydrogen ($H_2$), the fuel may also provide hydrogen as a reducing agent in the SCR process by introducing a small amount of $H_2$ from the fuel supply into the SCR system. The use of hydrogen as a $NO_x$ reducing agent enables the elimination of typical reducing agents such as, for example, ammonia ($NH_3$) and urea ($N_2H_6CO$) in the SCR system, and thus prevents discharge of ammonia slip into the ambient air, which is an inherent problem with current ammonia-based SCR technology.

Reduction of $NO_x$ using $H_2$ has the potential to generate reaction products that include both $N_2$ and $N_2O$. Catalysts that display high selectivity towards the formation of $N_2$ are preferred. Conversely, it has been found that the selectivity of Pt-based $H_2$—SCR catalysts toward $N_2$ formation is relatively low, and undesirable by-products such as $N_2O$ and $NH_3$ are produced. Recently, an attempt to improve $H_2$—SCR efficiency with respect to $NO_x$ removal and $N_2$ selectivity under oxidizing conditions was made (U.S. Pat. No. 7,105,137). The developed Pt-based catalyst described in U.S. Pat. No. 7,105,137 remained durable for only 24 hours when operating in a reaction mixture that contained 5 vol. % $O_2$, 5 vol. % $H_2O$, and up to 25 ppmv of $SO_2$. In addition, M. Machida et al. (Applied Catalysis B: Environmental 35 (2001) 107) demonstrated that a Pt-based $H_2$—SCR may have high selectivity to $N_2$ under oxidizing conditions (10 vol. % $O_2$) in the absence of $H_2O$ and $SO_2$ in the process stream. However, demonstrations of the $H_2$—SCR's ability to efficiently reduce $NO_x$ emissions were performed using mixtures of gases that have relatively low concentrations of $O_2$, $H_2O$, and $SO_2$ or high concentrations of only one of these constituents ($O_2$, $H_2O$, or $SO_2$). The exhaust gas composition of Machida et al. is contrasted to a gas turbine exhaust mixture from combustion of $H_2$-containing fuels at IGCC plants, which contain up to about 10% $O_2$, up to about 20% $H_2O$ and up to about 25 ppmv $SO_2$. Importantly, catalyst systems are known by one skilled in the art to be particularly prone to deactivation and degradation over time due to exposure to sulfur compounds and/or high concentrations of water vapor.

It is known by those skilled in the art that $H_2$—SCR is an efficient technology in $O_2$-lean conditions, especially when amounts of water and sulfur compounds are limited to less than about 5 vol. % and to less than about 5 ppmv, respectively.

Commercial processes, such as Selexol™, may remove greater than 97% of the sulfur from syngas. Still, the concentration of sulfur compounds in syngas can be up to about 25 ppmv even after treatment. Taking into consideration dilution of syngas with nitrogen, the concentration of $SO_2$ in IGCC gas turbine exhaust can be at the level of up to about 10 ppmv. After $CO_2$ sequestration and burning of $H_2$-fuel, concentrations of $H_2O$ in the exhaust can be as high as 20-25% by volume, and oxygen content can be as high as about 10-12 vol. %. Under these conditions, developing a process to reduce $NO_x$ emissions in the exhaust of IGCC gas turbines by using $H_2$—SCR is challenging. Thus, despite the above-described enhancements, there is a need to develop processes to reduce $NO_x$ emissions in gas turbine exhaust utilizing an $H_2$—SCR that provides high $NO_x$ reduction efficiency at the level of 90+% with high (greater than about 80%) selectivity to $N_2$. Additional processes are needed to substantially extend durability and stability of catalyst systems in the presence of 10-25 vol. % of water, 5-10 vol. % of $O_2$, and 5-25 ppm of $SO_2$, for example.

BRIEF DESCRIPTION OF THE DRAWINGS

The invention is explained in the following description in view of the drawings that show.

DETAILED DESCRIPTION OF THE INVENTION

The present inventors have surprisingly found that the inclusion of a pre-sulfated zirconia (Zr) binder in a palladium (Pd)-based SCR catalyst system substantially increases the durability of the Pd-based SCR catalyst system when operated in the presence of $SO_2$. Thus, in accordance with an aspect of the present invention, there is provided an improved process for the selective catalytic reduction of nitrogen oxides ($NO_x$) in a gas stream in the presence of $H_2$ using a pre-sulfated zirconia binder. The process comprises contacting the gas stream with a catalyst system. The catalyst system comprises (in its simplest form) sulfated-zirconium dioxide ($ZrO_2$)$SO_4$ and palladium (Pd) washcoated onto a ceramic honeycomb substrate (termed "monolith" in the art). The washcoat is adhered to the monolith using a pre-sulfated zirconia binder. In one embodiment, the monolith is first coated with ($ZrO_2$)$SO_4$ powder using a zirconia binder. The washcoated monolith is then calcined to "set" the binder. The washcoated monolith is then sulfated by dipping the monolith in a solution of sulfuric acid, which, while not wishing to be bound by any particular theory, coordinates sulfate with the zirconia employed as the binder. Following treatment with sulfuric acid, the catalyst is once again calcined and thereafter impregnated with a palladium solution. While not wishing to be bound by any particular theory, it is further believed that the pre-sulfated zirconia binder protects the palladium catalyst from degradation by binding sulfur to the defects in the crystalline zirconia structure, thereby minimizing further sulfur poisoning during contact with an exhaust gas containing $SO_2$.

Figure 1:
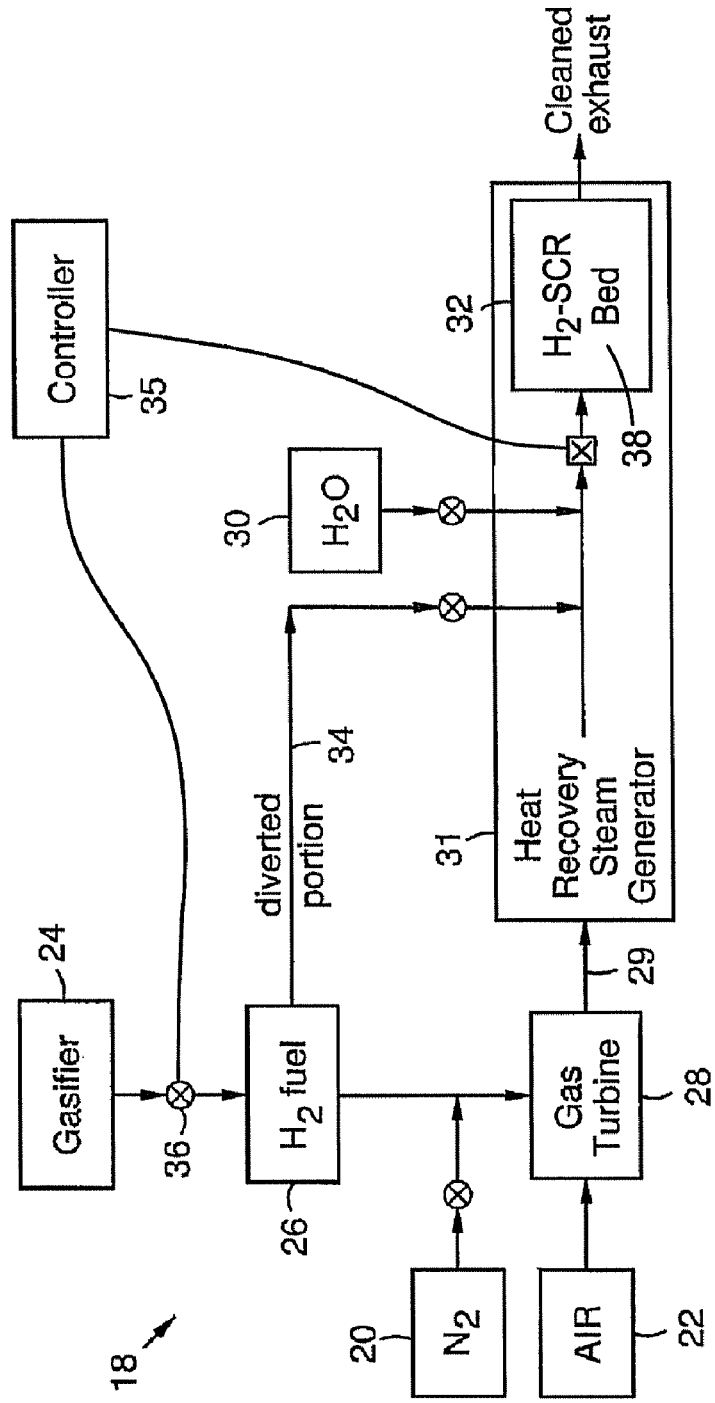
FIG. 1 is a schematic view of an integrated gasification combined cycle power plant in accordance with an aspect of the present invention.

Now referring to the figures, FIG. 1 illustrates an integrated gasification combined cycle power plant system 18 that produces an $H_2$-containing fuel 26 (syngas, or $H_2$-rich fuel after $CO_2$ capture) using a gasification process at gasifier 24. The fuel 26 is diluted with nitrogen 20, and combined with air 22 for combustion in a gas turbine 28. Turbine exhaust gas 29 is directed to a heat recovery steam generator (HRSG) 31, which includes or is otherwise located upstream of a selective catalytic bed 32 that is positioned at a location suitable for a desired SCR temperature operating range. The exhaust passes to a selective catalytic reduction bed, e.g., an $H_2$—SCR bed 32, where one or more $NO_x$ reduction catalyst layers promote the destruction of $NO_x$ by a reducing agent, such as for example $H_2$, producing primarily $N_2$ and $H_2O$. A diverted portion 34 of the $H_2$-containing fuel 26 may be used as a reducing agent for the $NO_x$ reduction reaction in the $H_2$—SCR bed 32. A water injection system 30 may be used to improve $NO_x$ reduction reactions within the $H_2$—SCR bed 32. A controller 35 is connected to sensors and valves 36 to sense and control the process. The $H_2$—SCR bed 32 comprises a catalyst system 38 with long-term stability when exposed to the exhaust gas 29 having high contents of oxygen, water, and sulfur.

In one embodiment, the $H_2$—SCR bed 32 is in a geometric form that allows for high $NO_x$ reduction efficiency along with a minimal pressure drop. Although beads, extrudates, etc. are suitable geometric forms employed in commercial applications, a monolith is a preferred form. The monolithic form and the use of a monolith as a catalyst carrier are well known to one skilled in the art. A monolith consists of a series of straight, non-interconnecting channels. Onto the walls of the monolith are coated a thin layer of a catalyst-containing material, termed "washcoat" by the trade. It is within the pores of the washcoat that the catalytically active metals and binder are located. Thus, in one embodiment, a honeycomb monolith may be washcoated with a catalyst system of the present invention as described herein.

Figure 4:
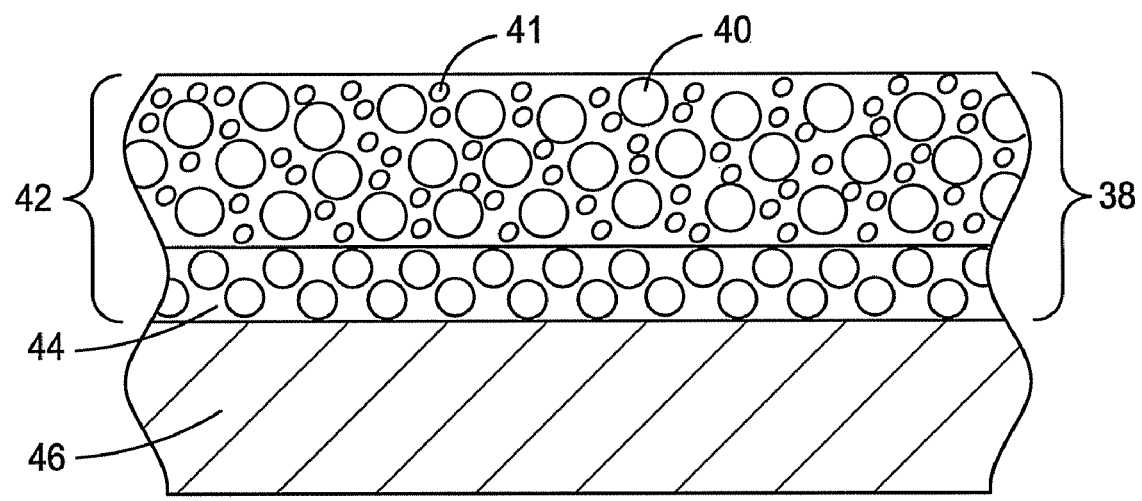
FIG. 4 shows a catalyst system in accordance with an aspect of the present invention.

In one embodiment, as shown in FIG. 4, the catalyst system 38 comprises a washcoat 42 comprises washcoat particles 41, a catalyst 40, and a pre-sulfated zirconia binder 44. The catalyst 40 is impregnated within or otherwise associated with the washcoat particles 41. While FIG. 4 depicts the pre-sulfated zirconia binder 44 as a distinct layer for ease of reference, it is understood that the pre-sulfated zirconia binder 44 may be uniformly distributed throughout the washcoat 42. The pre-sulfated zirconia binder 44 enables the washcoat 42 containing the catalyst 40 to be bound to the monolithic substrate 46.

As was shown in U.S. patent application Ser. No. 12/122,116, the entirety of which is incorporated by reference, a palladium (Pd) catalyst showed a substantial increase in $NO_x$ reduction efficiency over a platinum (Pt) catalyst disclosed in U.S. Pat. No. 7,105,137, for example, under gas turbine exhaust conditions. It was previously found in U.S. Pat. No. 7,105,137 that platinum (Pt) catalysts with different supports ($Al_2O_3$, MgO), $TiO_2$, $CeO_2$, $Y_2O_3$, etc.), have a relatively high selectivity to $N_2O$, which is an undesirable pollutant. Accordingly, in one embodiment of the present invention, the catalyst 40 is a palladium catalyst. Advantageously, the palladium catalyst is not only resistant to water in a process stream, but the water may have a positive influence on the palladium catalyst performance in a range of concentrations up to about 25 vol. %, especially between 15-23%, and preferably between 17-21%, with a peak at about 20%. Further increase of water concentrations above about 20% may cause a slight decrease of the catalyst performance with respect to $NO_x$ emissions. In yet another embodiment, the catalyst 40 may comprise another suitable catalyst known in the art in conjunction with the palladium catalyst.

Further, in one embodiment, the washcoat 42 comprises washcoat particles 41, which may be sulfated-zirconia or sulfated-zirconia-silica oxides (e.g., ($ZrO_2$)$SO_4$ or ($ZrO_2$—$SiO_2$)$SO_4$), for example. In one embodiment, the washcoat particles 41 comprise ($ZrO_2$—$SiO_2$)$SO_4$ and the ratio of $SiO_2$ to $ZrO_2$ is approximately 50% by weight. To prepare the sulfated zirconia or zirconia-silica washcoat particles 41, zirconium hydroxide (a precursor for $ZrO_2$) or zirconium hydroxide plus a silica source may be treated with sulfuric acid or other sulfur-containing acids (e.g. sulfurous acid), or, alternatively, ammonium bisulfate, then calcined at an elevated temperature to bind the sulfate to the zirconia. For example, sulfated $ZrO_2$ may be prepared by blending zirconium hydroxide with deionized (DI) water and adjusting the pH to 3.0 with sulfuric acid. Alternatively, sulfated $ZrO_2$—$SiO_2$ may be prepared by blending zirconium hydroxide and a silica source, such as, for example, colloidal silica, fumed silica, or finely crushed silica particles, adding DI water, and adjusting the pH to 3.0 with sulfuric acid. It is noted that the addition of sulfate to the washcoat particles 41 enhances the maximum $NO_x$ reduction efficiency and reduces the operating temperature of the catalyst. Once blended, the resulting solids are separated from the solution, then dried and calcined at a temperature greater than 500° C. and preferably at a temperature between 600° C. and 650° C.

It is understood by one skilled in the art that catalytic materials may diffuse partly into or throughout the substrate to which the washcoat is applied (e.g., a monolith), thus blurring the interface between the washcoat and the substrate. However, "washcoat" is nevertheless a useful term because it indicates a region of catalytic material at the surface of a catalytic bed in which certain percentages by weight apply.

The catalyst system 38 also comprises a pre-sulfated zirconia binder 44. Binders are typically used to adhere the solid catalyst support material to the monolithic substrate. Exemplary conventional binders include clays, aluminas, silicas, zirconias, etc. The present inventors, however, have surprisingly found that the use of a pre-sulfated zirconia binder over such conventional binders significantly improves the long-term durability of the catalyst system 38 when the catalyst system 38 is used for the reduction of nitrogen oxides ($NO_x$) in a sulfur-containing gas stream. By "pre- sulfated," it is meant that the sulfated binder is incorporated into a catalyst system during preparation and prior to exposing the catalyst system to a flowing sulfur-containing gas stream. Sulfur-containing gas streams include exhaust gases from a gas turbine power generating station at a coal gasification plant. Such exhaust gas streams typically comprise $NO_x$, $H_2O$, $O_2$, and $SO_2$.

In one embodiment, the pre-sulfated zirconia binder 44 comprises sulfuric acid-treated zirconia ($ZrO_2$). The zirconia may be sulfated via any suitable method known to one skilled in the art. In one particular embodiment, the pre-sulfated zirconia binder 44 may be prepared by combining and mixing crushed and calcined zirconia sulfate or zirconia-silica-sulfate, a zirconia salt solution (such as for example ziconium oxynitrate, zirconium oxychloride, zirconium acetate), optionally ammonium metatungstate (to act as a promoter), and deionized water to form a slurry. Monolith cores are dipped in the slurry with excess slurry blown from the channel using an air knife or similar tool. The washcoated monolith is then dried and calcined at an elevated temperature, e.g., at 450° C., to decompose the zirconia salt employed as the binder. After calcination, the washcoated monolith may be dipped into a solution of sulfuric acid or ammonium bisulfate, with sulfuric acid being the preferred source. The sulfate content of the solution may be from 1-5% by volume of the solution. The catalyst cores may then be dried and calcined at a temperature sufficient to intercalate sulfate into the binder, e.g. at 650° C. for 2 hours. A further particular example of the preparation of a pre-sulfated zirconia binder 44 is presented in Example 2 below. In one embodiment, the mass ratio of the pre-sulfated zirconia binder to the catalyst system is between 0.001 and 0.4. The resulting catalyst is then impregnated with palladium solutions using methods known to one skilled in the art.

In one embodiment, in producing the sulfated zirconia binder 44, zirconia is combined with sulfuric acid according to the following reaction, thereby producing zirconium sulfate and water.

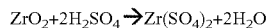

$$ZrO_2 + 2H_2SO_4 \rightarrow Zr(SO_4)_2 + 2H_2O$$

While not wishing to be bound by theory, it is believed that the produced zirconium sulfate binds to the palladium catalyst (when combined) and/or fills in interstitial spaces between the catalyst-containing washcoat 42 and the substrate 44 to which the washcoat 42 is adhered by the binder 44. In addition, it is believed these effects protect the catalyst system 38 from degradation during operation and exposure to sulfur-containing gas streams.

In a particular embodiment, a catalyst system 38 comprising zirconia, sulfur, palladium, silica, and tungsten (to act as a promoter), is prepared according to the following steps:

1. Zirconia-silica sulfate (($ZrO_2$—$SiO_2$)$SO_4$) is prepared, then calcined at 450° C. to 850° C. for between 15 minutes and 48 hours, with a preferred calcination time of 2 hours and the preferred calcination temperature between 600° C. and 650° C.

2. A monolithic substrate is washcoated with the prepared ($ZrO_2$—$SiO_2$)$SO_4$ powder and with promoters such as for example, tungsten or other transition metals, using a zirconia binder, then calcined at a temperature and duration effective to decompose the metal salts, such as for example, 350° C. to 650° C., for about 1 hour.

3. The washcoated monolith is then pre-sulfated by dipping the monolith in a sulfur-containing solution, e.g., sulfuric acid, then dried and calcined at a temperature between about 500° C. and 850° C., and preferably 600° C. to 650° C. for a duration of between 1 hour and 5 hours, with the preferred duration of 2 hours.

4. The washcoated monolith is then impregnated with a palladium metal precursor using techniques known to one skilled in the art, such as, for example, dipping the washcoated monolith in a palladium solution, blowing the excess solution from the channels, then drying and calcining the monolith at a temperature sufficient to decompose the palladium metal precursor.

The following description discusses the use of a catalyst system 38 for removing $NO_x$ from a predetermined gas stream. When it is desired to operate the catalyst system 38 at low temperatures, for example at temperatures less than about 200° C., the catalyst 40 (e.g., palladium) may be activated by flowing an oxygen-containing gas over the catalyst 40 (prior to operation) at a temperature sufficient to oxidize any residue (e.g. carbon or carbon-containing compounds) associated with the palladium metal precursor. This is because while calcining the catalyst 40 in the monolithic form, there is little, if any, flow through the channels of the monolith. As a result, the palladium metal precursors are decomposed, but a portion of the decomposition residue still remains on the surface of the catalyst 40, potentially inhibiting the activity of the resulting catalyst during start-up and periods of operation. As a result, the catalyst 40 must be "activated" prior to use by heating to a temperature sufficient to oxidize the residue, thereby removing the residue from the surface of the catalyst 40. Typically, this temperature is greater than about 200° C. The activation temperature is critical because the normal operating temperature of the catalyst, typically on the order of 120° C., is not sufficient to readily oxidize this residue.

The catalyst system 38 is very stable without deactivation over extended periods of time, and demonstrates a high $NO_x$ reduction efficiency, even in the presence of up to 50 ppmv of $SO_2$, an $O_2$ content 5-10 vol. %, and water up to 25 vol. %. Moreover, the use of a pre-sulfated zirconia binder dramatically improves the durability of the catalyst, which presents an opportunity to achieve high $NO_x$ removal efficiency in gas turbine exhaust for longer periods of time.

The catalytic process described in an aspect of the present invention enables 90% to greater than 97% $NO_x$ reduction efficiency in a simulated gas turbine exhaust in some applications by using hydrogen as a reducing agent in a temperature range of 70° C. to 250° C., preferably between 100-140° C., with a process stream comprising 0-20 vol. % oxygen, and 0-25 vol. % of water. The concentration of palladium (also referred to as the palladium loading of the catalyst) may be in the range of 0.1-2.0 wt. %, or preferably in the range of 0.3-1.1 wt. %, or more preferably in the range of 0.5-0.75 wt. % (by weight of the washcoat). Hydrogen is mixed with the exhaust gas to achieve a molar ratio for $H_2/NO_x$ in the exhaust gas of 10 to 100, and preferably about 40 to 80 for optimal $NO_x$ reduction efficiency. The $H_2/NO_x$ ratio will depend on several factors that include, but are not limited to, the concentration of $NO_x$ in the process stream, the operating temperature, the exhaust space velocity, and the desired level of $NO_x$ reduction.

In one embodiment, the catalyst system 38 further comprises a promoter. In a particular embodiment, the promoter is tungsten (W), which may substantially improve the catalyst performance. Advantageously, the addition of a small amount of tungsten enables a high $NO_x$ removal efficiency within a wider range of concentrations of water and $SO_2$ conditions in the gas turbine exhaust. In one embodiment, the tungsten loading is in the range of 0.5 to 5.0 wt. % (by wt of the washcoat). While not wishing to be bound by any particular theory, it is believed that addition of promoters, such as W, helps to reduce the oxidation activity of the catalyst 40 and consequently decreases the oxidation of $H_2$ to water, thereby making greater concentrations of $H_2$ available to the process throughout the length of the catalytic bed. As a result more hydrogen is available in the reaction zone to facilitate the reduction of $NO_x$ in the presence of $H_2$ to produce $N_2$ and water.

Introducing water into the exhaust downstream of the gas turbine can improve the $NO_x$ reduction efficiency of the present catalyst 40 should insufficient water (less than about 20%) be present in the exhaust. Thus, water content may be used as an active parameter to increase $NO_x$ removal. For example, steam can be mixed with the $H_2$ stream and injected through an $H_2$ distribution grid upstream of the $H_2$—SCR. This setup also allows for additional water to be added to the process stream when additional water is needed to achieve the target $NO_x$ reduction efficiency. However, there comes a point above about 20% $H_2O$ vol. % when additional water actually causes a decrease in the $NO_x$ removal efficiency. In one embodiment, the range of $H_2O$ is about 15-23 vol. %, and in a particular embodiment, is from about 17-21 vol. %. It is believed that the addition of water into the process stream up to a certain level allows for reducing the $H_2$ oxidation rate according to the LeChatelier's principle. The further increase of water concentration in the exhaust is believed to reduce $NO_x$ removal efficiency due to blockage of some of the active sites.

The temperature of the $H_2$—SCR bed 32 may be maintained in a desirable range by choosing the appropriate location for the $H_2$—SCR bed 32 in the HRSG 31 and by controlling the amount of heat removed by heat exchanged surfaces within the HRSG 31 as is known in the art. The exhaust temperature may be further adjusted to the optimum by temperatures and amounts of injected $H_2O$ and diverted hydrogen fuel. A lower boundary of an operational temperature range may be established above a dew point temperature in the exhaust stream. The dew point depends upon the concentration of $H_2O$ and other constituents (e.g., $SO_2/SO_3$) of the exhaust stream and its pressure. Operation above the dew point will avoid water condensation in the $H_2$—SCR bed 32 and in post-$H_2$—SCR bed 32 areas. This restricts an operation of the $H_2$—SCR at the temperatures below 110-120° C. in some exhaust conditions where high $SO_3$ levels are present.

The below examples are provided to illustrate certain aspects of the present invention and are not intended to be limiting in any respect.

EXAMPLE 1

Table 1 shows a dramatic improvement achieved as a result of utilizing a catalyst system 38 having the pre-sulfated zirconia binder 44 and prepared according to the procedure described under Example 4 below. A catalyst system comprising a non-sulfated zirconia binder was prepared as set forth in U.S. patent application Ser. No. 12/122,116, the entirety of which is hereby incorporated by reference. The improved catalyst system 38 includes the pre-sulfated zirconia binder 44. Advantageously, the pre-sulfated binder 44 enables the stable operation of the catalyst 40 with a $NO_x$ conversion greater than 90% for at least 1500 hours. See Table 1 below.

TABLE 1

Effects of binder composition on the conversion of NO$x$ using a Pd/W/($ZrO_2$—$SiO_2$)$SO_4$ catalyst system.

| Hours of operation | Zirconia binder NO$x$ Conversion | Pre-sulfated Zirconia binder NO$x$ Conversion |
| --- | --- | --- |
| 25 hrs | 98.0% | 96.6% |
| 250 hrs | 97.8% | 96.1% |
| 500 hrs | 91.1% | 96.2% |
| 750 hrs | 88.3% | 96.1% |
| 780 hrs | 60% | 96.3% |
| 1500 hrs | NA | 96.8% |

[NO$x$] = 10 ppm, [$H_2O$] = 20%, [$SO_2$] = 1-5 ppmv, $H_2$/NO$_x$ molar ratio = 80.

As shown by the results set forth in Table 1, only a catalyst system having a pre-sulfated zirconia binder is durable far beyond 750 hours of operation with higher then 90% reduction efficiency of $NO_x$. Conversely, the non-sulfated zirconia binder in $H_2$—SCR beds (of the same formulation) lead to a very significant decline of the catalyst $NO_x$ removal efficiency. This effect was especially visible beyond 750 hours of operation. The detailed investigation of the reason for such sharp decline for a catalyst with non-sulfated zirconia binders revealed that the presence of sulfur compounds in the treated mixture eventually caused poisoning of the catalyst due to formation of strong chemical bonds between Pd and sulfur. This phenomenon was observed not take place when the pre-sulfated zirconia binder is utilized.

EXAMPLE 2

Figure 2:
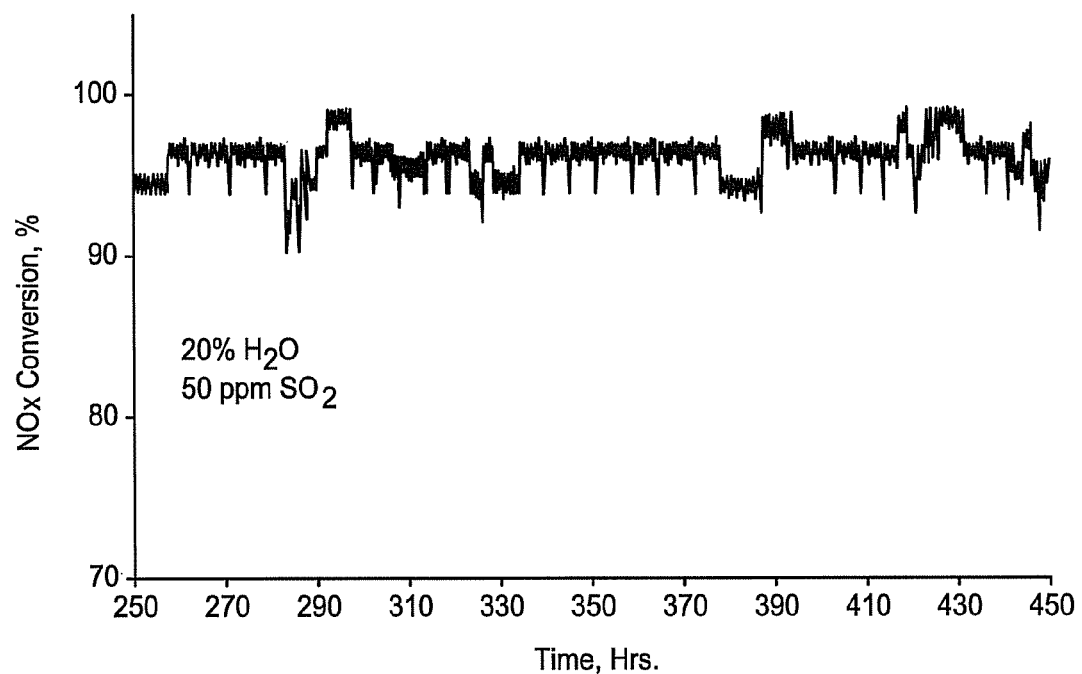
FIG. 2 shows $NO_x$ reduction efficiency over 450 hours for a catalyst system prepared using a pre-sulfated zirconia binder in accordance with an aspect of the present invention. The process stream comprises 10 ppm NOx, 20% $H_2O$, 1-5 ppm $SO_2$, and a $H_2/NO_x$ molar ratio of 80, and 50 ppm of $SO_2$ were added to the process stream.

In order to test the durability of a catalyst system having a pre-sulfated zirconia binder prepared according to the procedure described under Example 4 below, high concentrations (up to 50 ppm) of $SO_2$ were added into a process stream comprising 10 ppm $NO_x$, 20% $H_2O$, $H_2$/NO$_x$ molar ratio of 80. The obtained results are given in the FIG. 2. These results indicate that the catalyst system having the pre-sulfated zirconia binder is able to retain a high level of $NO_x$ conversion even in the presence of 50 ppm $SO_2$ at least for 450 hours of operation.

EXAMPLE 3

Figure 3:
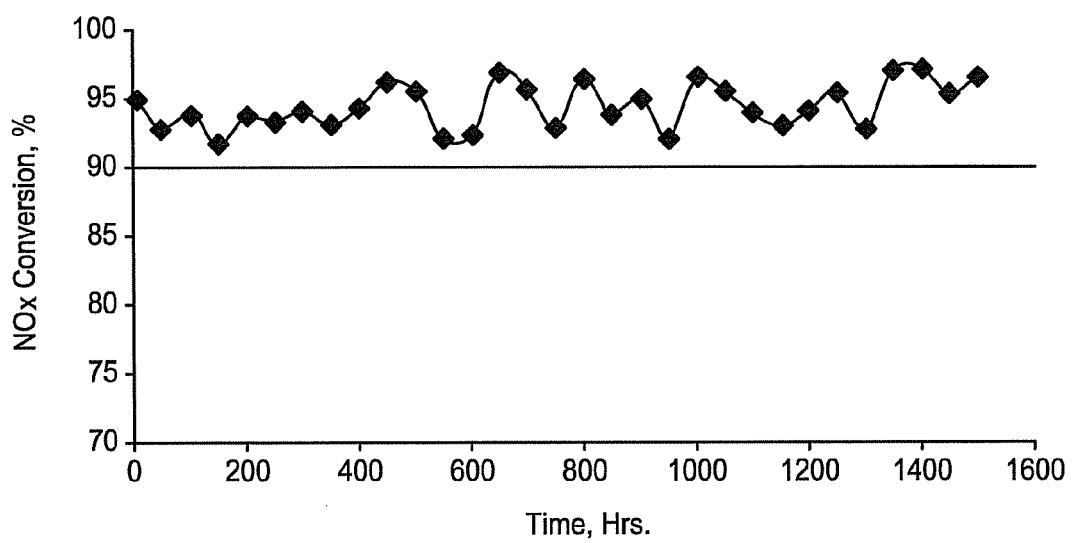
FIG. 3 shows the conversion of $NO_x$ over 1600 hours as a function of time-on-stream for a catalyst system prepared using a pre-sulfated zirconia binder in accordance with an aspect of the present invention.

This example reports the conversion of $NO_x$ as a function of time-on-stream for catalyst system having a pre-sulfated zirconia binder prepared according to the procedure described under Example 4 below. The obtained results are provided in FIG. 3. The run was performed with the addition of 1 ppm $SO_2$ to a process stream comprising 10 ppm $NO_x$, 20% $H_2O$, 1-5 ppm $SO_2$, $NO_x$/$H_2$ molar ratio of 80. The results presented in FIG. 3 demonstrate that the catalyst is stable and is able to maintain a stable level of $NO_x$ conversion greater than 90% throughout the 1400 hours of continuous operation. Following 775, 1000, 1175, and 1350 hours of continuous operation, the catalyst was subjected to re-starts. Re-starting the catalyst involved terminating all flows and temperatures. Once cooled to less than 50° C., the catalyst is re-started in flowing process gas. Importantly, the catalyst is able to retain its remarkable performance following repeated start-ups.

EXAMPLE 4

This example illustrates a method of synthesis of a Pd-based catalyst supported with pre-sulfated zirconia binder on $ZrO_2$—$SiO_2$ to form Pd/W ($ZrO_2$—$SiO_2$)$SO_4$ with approximately 0.75 wt % Pd. To arrive at the catalyst system, 4.5 Kg of zirconium hydroxide was added to a 5 gallon pail with 4.5 L of DI water and 750 g of a colloidal silica solution (40% $SiO_2$). The pH of the zirconium hydroxide/silica solution was adjusted to about 3.0 with sulfuric acid and mixed overnight. The following morning, the solution was emptied into a pan and placed in an oven to dry at 110° C. for until all the water was evaporated. Once dried, the resulting zirconia-silica-sulfate material was crushed below 40-mesh and calcined at 650° C. for 2 hrs.

The washcoat with binder was prepared by adding 21 g of said zirconia-silica-sulfate, 21 g of a zirconium oxynitrate solution (20% $ZrO_2$), 0.266 g ammonium metatungstate (Aldrich) and 50 mL of DI water to a beaker. Monolith cores (230 cells per square inch (cpsi)) were dipped in the slurry with excess slurry blown from the channels using an air knife. Catalyst cores were calcined at 450° C. for 1 hour. The washcoat loading was approximately 110 g per liter of monolith. After calcining, the cores were cooled and dipped into a solution of 2 g sulfuric acid in 98 g DI water yielding a 1.98% sulfuric acid loading (2% sulfuric acid per washcoat). Blocks were then dried in a microwave and calcined at 650° C. for 2 hours.

A palladium metal solution was prepared by adding to a beaker: 8.165 g palladium chloride solution (8.94% Pd), 2.2 g TEA (triethanolamine) and sufficient DI water to yield a 100 g total solution weight. Monolith blocks were dipped in the solution yielding a 0.78% Pd loading by washcoat (catalyst system) weight. Blocks were dried in a microwave oven for 2-10 minutes and then calcined at 450° C. for 2 hours. The effectiveness of the catalyst system provided by this Example is set forth in Table 1, Examples 1-3, and FIGS. 2-3 herein.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

EXAMPLE 5

Comparative

This example illustrates a method of synthesis of a Pd-based catalyst supported with non-sulfated zirconia binder on $ZrO_2$—$SiO_2$ to form Pd/W ($ZrO_2$—$SiO_2$)$SO_4$ with approximately 0.75 wt % Pd. To arrive at this catalyst system, 4.5 Kg of zirconium hydroxide was added to a 5 gallon pail with 4.5 L of DI water and 750 g of a colloidal silica solution (40% $SiO_2$). The pH of the zirconium hydroxide/silica solution was adjusted to about 3.0 with sulfuric acid and mixed overnight. The following morning, the resulting zirconia-silica-sulfate solution was emptied into a pan and placed in an oven to dry at 110° C. until all the water was evaporated. Once dried, the zirconia-silica-sulfate material was crushed below 40-mesh and calcined at 650° C. for 2 hrs.

The washcoat with binder was prepared by adding 21 g of said zirconia-silica-sulfate, 21 g of a zirconium oxynitrate solution (20% $ZrO_2$), 0.266 g ammonium metatungstate, and 50 mL of DI water to a beaker. The monolith cores (230 cpsi) were dipped in the slurry, with the excess slurry blown from the channels using an air knife. Catalyst cores were calcined at 450° C. for 1 hour. The washcoat loading was approximately 110 g per liter of monolith.

A palladium metal solution was prepared by adding to a beaker: 8.165 g palladium chloride solution (8.94% Pd), 2.2 g TEA (triethanolamine) and sufficient DI water to yield a 100 g total solution weight. Monolith blocks were dipped in the solution yielding a 0.78% Pd loading by washcoat weight. Blocks were dried in a microwave oven for 2-10 minutes and then calcined at 450° C. for 2 hours.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for selective catalytic reduction of nitrogen oxides ($NO_x$) in a gas stream in the presence of $H_2$, the process comprising contacting the gas stream with a catalyst system, the catalyst system comprising ($ZrO_2$)$SO_4$, palladium, and a pre-sulfated zirconia binder.

2. The process of claim 1, wherein the pre-sulfated zirconia binder comprises sulfuric acid-treated $ZrO_2$.

3. The process of claim 1, wherein a mass ratio of the pre-sulfated zirconia binder to the catalyst system is between 0.001 and 0.4.

4. The process of claim 1, wherein the catalyst system further comprises tungsten.

5. The process of claim 1, wherein the catalyst system further comprises $SiO_2$ in the form of zirconia-silica-sulfate.

6. The process of claim 1, wherein a loading of the palladium is from 0.01 to 2.0% by wt of the catalyst system.

7. The process of claim 6, wherein the loading of the palladium is from 0.5 to 0.75% by wt of the catalyst system.

8. The process according to claim 1, wherein a catalytic bed comprising the catalyst system is installed in a flow path of an exhaust gas stream of a gas turbine, wherein the exhaust gas stream comprises $NO_x$, $H_2O$, $O_2$, and $SO_2$.

9. The process of claim 8, wherein $H_2O$ and hydrogen are injected into the exhaust gas between the gas turbine and the catalytic bed, to a concentration of about 5-25 vol. % $H_2O$ and a molar ratio for $H_2/NO_x$ in the range of 10 to 100 in the exhaust gas.

10. The process of claim 8, wherein the exhaust gas is passed over the catalytic bed at a temperature maintained in a range of 100-140° C.

11. The process of claim 8, wherein the catalytic bed is installed in the flow path of exhaust gas of the gas turbine in an integrated gasification combined cycle (IGCC) power generation plant that synthesizes a hydrogen-containing fuel for the gas turbine, and further comprising:
   diverting a portion of the hydrogen-containing fuel to supply the $H_2$ as a $NO_x$ reducing agent;
   injecting water and the diverted portion of the hydrogen-containing fuel into the exhaust gas between the gas turbine and the catalytic bed to a concentration of about 15-25 vol. % $H_2O$ and a molar ratio for $H_2/NOx$ in the range of 10-100 in the exhaust gas; and
   passing the exhaust gas over the catalytic bed at a temperature between 70-250° C.

12. The process of claim 11, wherein the $H_2O$ is injected to a concentration of about 17-21 vol. %.

13. A process for selective catalytic reduction of nitrogen oxides ($NO_x$) in a gas stream using a hydrogen reducing agent, comprising:
   preparing a catalyst system on a catalytic bed, wherein the catalyst system comprises $(ZrO_2)SO_4$, palladium, and a pre-sulfated zirconia binder;
   positioning the catalytic bed in an exhaust stream of a gas turbine;
   injecting the hydrogen reducing agent into the exhaust stream upstream of the catalytic bed to a molar ratio for $H_2/NO_x$ in the exhaust stream in the range of 10-100;
   injecting $H_2O$ into the exhaust stream upstream of the catalytic bed to maintain an $H_2O$ concentration in the exhaust stream of about 15-23 vol. %; and
   passing the exhaust stream over the catalytic bed at an operating temperature range of 70-250° C.

14. The process of claim 13, wherein the gas turbine is installed in an integrated gasification combined cycle plant (IGCC), and further comprising:
   producing a hydrogen-containing fuel in a gasifier of the IGCC for the gas turbine;
   diverting a portion of the hydrogen-containing fuel as the hydrogen reducing agent; and
   cooling the exhaust stream to the operating temperature range of the catalytic bed by means of a heat recovery steam generator in the IGCC, wherein a lower bound of the operating temperature range is established above a dewpoint in the exhaust stream.

15. A system for implementing a process for selective catalytic reduction of nitrogen oxides ($NO_x$) in an exhaust gas from a gas turbine in an integrated gasification combined cycle power plant, comprising:
   a fuel gas synthesizer that produces a fuel gas containing at least 10 vol. % $H_2$ and at least 10 vol. % nitrogen;
   a gas turbine that burns a portion of the fuel gas, producing the exhaust gas;
   a catalytic bed installed in a flow path of the exhaust gas, the catalytic bed comprising a catalyst system comprising $(ZrO_2)SO_4$, palladium, and a pre-sulfated zirconia binder;
   a hydrogen injector that mixes a diverted portion of the fuel gas into the exhaust gas between the gas turbine and the catalytic bed;
   an $H_2O$ injector that mixes $H_2O$ into the exhaust gas between the gas turbine and the catalytic bed; and
   sensors and valves at control points in the system connected to a controller that maintains operational conditions in the exhaust gas at the catalytic bed, wherein the operational conditions comprise a temperature between 70-250° C., a molar ratio for $H_2/NO_x$ in the range of 10-100, and $H_2O$ at a concentration of about 15-23 vol. %.

16. The system of claim 15, wherein the pre-sulfated zirconia binder comprises sulfuric acid-treated $ZrO_2$.

17. The system of claim 15, wherein a mass ratio of the pre-sulfated zirconia binder to the catalyst system is between 0.001 and 0.4.

18. The system of claim 15, wherein the catalyst system is installed in a flow path of an exhaust gas stream of a gas turbine, wherein the exhaust gas comprises $NO_x$, $H_2O$, $O_2$, and $SO_2$.

* * * * *